(12) United States Patent
Tracht

(10) Patent No.: US 7,290,791 B2
(45) Date of Patent: Nov. 6, 2007

(54) VEHICLE SEAT ASSEMBLY WITH AIR BAG GUIDE RETAINER

(75) Inventor: Michael L. Tracht, Ingolstadt (DE)

(73) Assignee: Lear Corporation, Southfield, MI (US)

( * ) Notice: Subject to any disclaimer, the term of this patent is extended or adjusted under 35 U.S.C. 154(b) by 252 days.

(21) Appl. No.: 10/904,834

(22) Filed: Dec. 1, 2004

(65) Prior Publication Data

US 2006/0113761 A1    Jun. 1, 2006

(51) Int. Cl.
*B60R 21/16* (2006.01)
(52) U.S. Cl. ................... 280/730.2; 280/728.3
(58) Field of Classification Search ............. 280/730.2, 280/728.3, 728.1
See application file for complete search history.

(56) References Cited

U.S. PATENT DOCUMENTS

| 5,749,597 A | 5/1998 | Saderholm |
| 5,816,610 A | 10/1998 | Higashiura et al. |
| 5,860,673 A | 1/1999 | Hasegawa et al. |
| 5,927,749 A | 7/1999 | Homier et al. |
| 5,938,232 A | 8/1999 | Kalandek et al. |
| 5,967,546 A | 10/1999 | Homier et al. |
| 6,045,151 A | 4/2000 | Wu |
| 6,237,934 B1 | 5/2001 | Harrell et al. |
| 6,588,838 B1 | 7/2003 | Dick, Jr. et al. |

FOREIGN PATENT DOCUMENTS

| DE | 103 07 480 A1 | 9/2004 |
| EP | 0 782 944 A | 7/1997 |
| FR | 2 806 685 A1 | 9/2001 |
| GB | 2 410 011 A | 7/2005 |
| WO | WO 00/06426 | 2/2000 |

*Primary Examiner*—Eric Culbreth
(74) *Attorney, Agent, or Firm*—Brooks Kushman P.C.

(57) ABSTRACT

In at least certain embodiments, the vehicle seat assembly comprises a frame, a seat pad, a trim cover extending over the seat pad and including a release seam adjacent the seat pad, and an air bag assembly within the trim cover. In accordance with this embodiment, the air bag assembly includes an inflator and an air bag inflatable to project outwardly from the seat through the air bag release seam of the trim cover. Further in accordance with this embodiment, the vehicle seat assembly further includes an air bag guide including an inner panel and an outer panel that have outer extremities, and a rigid plastic connector for connecting the outer extremities of the flexible inner and outer panels to each other adjacent the air bag release seam.

9 Claims, 3 Drawing Sheets

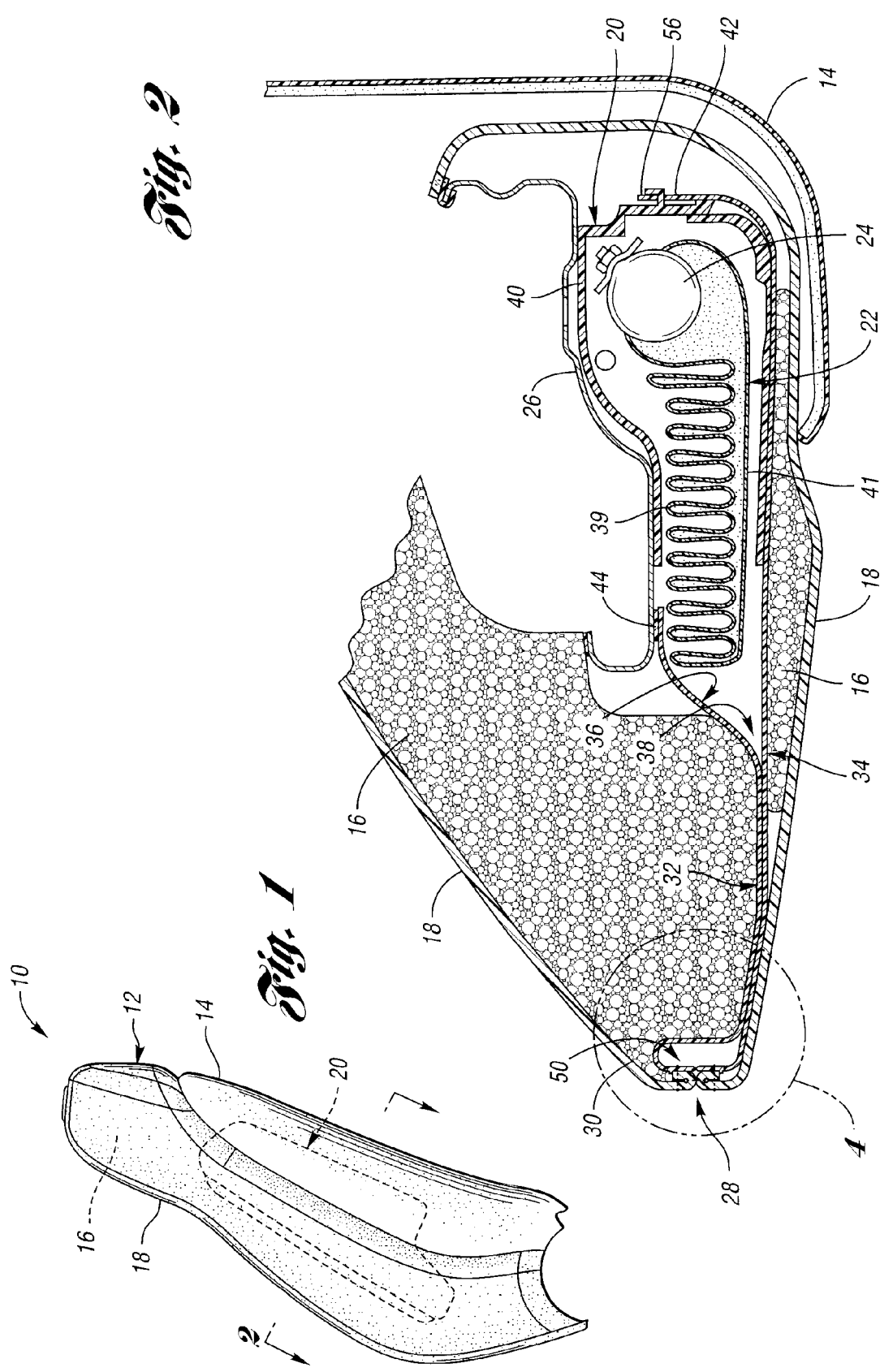

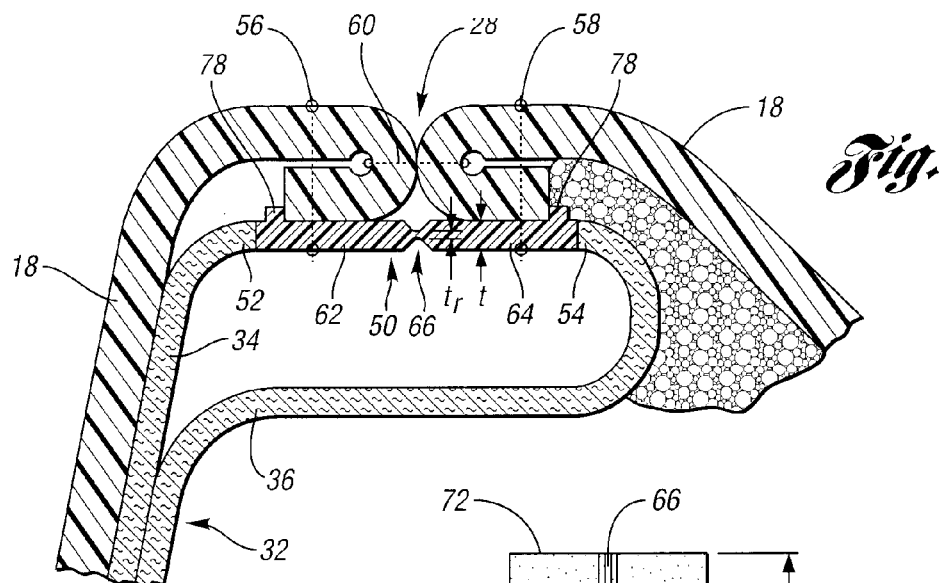
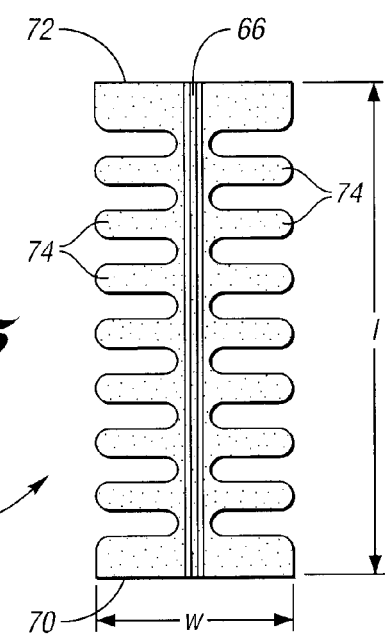
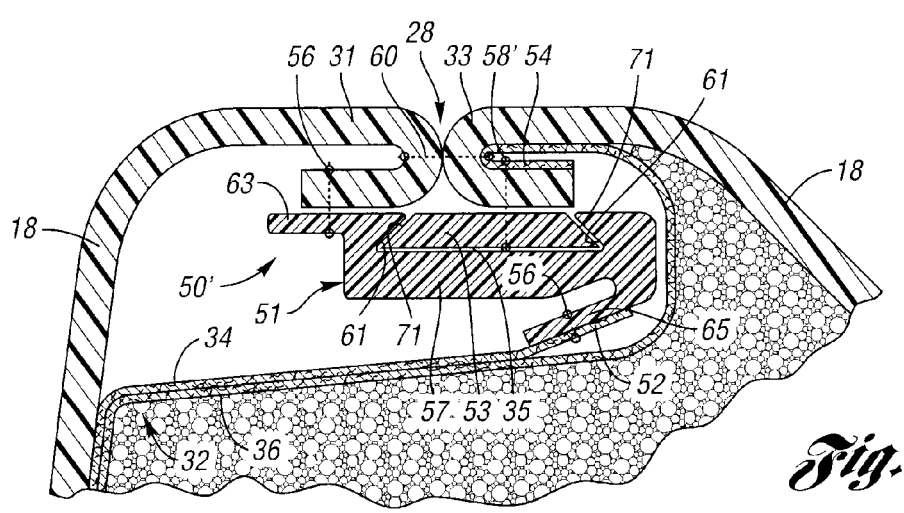

VEHICLE SEAT ASSEMBLY WITH AIR BAG GUIDE RETAINER

BACKGROUND OF THE INVENTION

1. Field of the Invention

The present invention relates to a vehicle seat assembly, and in particular, a seat assembly including an air bag.

2. Background Art

Vehicles can be equipped with side air bags, which may be in the form of a side air curtain disposed in a headliner of the vehicle, or alternatively, may be an air bag disposed within a vehicle seat assembly. One limitation of air bags that are located within a seat assembly is that the air bag needs to break through the seating material before it can fully deploy to protect a vehicle occupant. During deployment, such an air bag may encounter foam, or other seat pad materials, and must then break through a seat trim cover in order to escape from the seat assembly. Another limitation is that the air bag should break through the cover material at a predetermined location to optimize effectiveness.

Prior vehicle seat assemblies equipped with side air bags and manufacturing methods are disclosed in U.S. Pat. Nos. 5,816,610, 5,860,673, 5,938,232, 6,045,151, 6,237,934 and 6,588,838, for example.

SUMMARY OF THE INVENTION

Under the invention, a vehicle seat assembly is provided. In at least one embodiment, the vehicle seat assembly comprises a frame, a seat pad adjacent the frame, and a trim cover extending over the seat pad and including a release seam adjacent the seat pad, and an air bag assembly mounted on the frame within the trim cover in a spaced relationship from its air bag release seam. In accordance with this embodiment, the air bag assembly includes an inflator and a folded air bag that is inflated by the inflator to unfold and project outwardly from the seat through the air bag release seam of the trim cover. Further in accordance with this embodiment, the vehicle seat assembly further includes an air bag guide including an inner panel and an outer panel that are each made of flexible material and have outer extremities, and a rigid plastic connector for connecting the outer extremities of the flexible inner and outer panels to each other adjacent the air bag release seam.

In at least one embodiment, the connector is connected to the trim cover adjacent the air bag release seam. In yet another embodiment, the stitching connects the connector to the trim cover adjacent the air bag release seam.

In at least another embodiment, the connector is a unitary member that extends between and connects outer extremities of the flexible inner and outer panels to each other adjacent the air bag release seam.

In still yet at least another embodiment, the member includes a frangible portion adjacent the air bag release seam.

In yet at least another embodiment, the vehicle seat assembly comprises a frame, a seat pad adjacent the frame, and a trim cover extending over the seat pad that includes a release seam adjacent the seat pad and an outer surface and an inner surface. In this embodiment, the seat assembly further comprises an air bag assembly within the trim cover in a spaced relationship from its air bag release seam, with the air bag assembly including an inflator and a folded air bag that is inflated by the inflator to unfold and project outwardly from the seat through the air bag release seam of the trim cover. In this embodiment, the seat assembly also further comprises an air bag guide including an inner panel and an outer panel having outer extremities, and a connector extending between and connecting the outer extremities of the inner and outer panels to each other adjacent the air bag release seam, and with the connector being disposed between the air bag release seam and the air bag assembly adjacent the inner surface of the trim cover.

In still yet at least another embodiment, the vehicle seat assembly comprises a frame, a seat pad mounted on the frame, a trim cover extending over the seat pad and including a release seam adjacent the seat pad, and an air bag assembly mounted on the frame within the trim, with the air bag assembly including an inflator and an air bag that is inflated by the inflator to project outwardly from the seat through the air bag release seam of the trim cover. In this embodiment, the seat assembly further comprises an air bag guide including a first panel and a second panel, with each panel being made of flexible material and having outer extremities, and a rigid plastic connector for connecting the outer extremities of the panels to each other adjacent the air bag release seam, wherein the connector is connected to the trim cover adjacent the air bag release seam.

In at least one embodiment, the connector comprises a first connector portion connecting a first portion of the trim cover with a first one of the panels and a second connector portion connected to a second portion of the trim cover and the second one of the panels.

In at least another embodiment, the first connector portion has a main body portion having a recess for receiving the second connector portion, the first connector portion further including a leg extending from the body portion connected to the first portion of the trim cover and a tab portion extending from the body portion connected to the first panel.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 1 is a fragmentary side view of a portion of a seat assembly in accordance with the present invention;

FIG. 2 is a fragmentary sectional view of the seat assembly shown in FIG. 1, taken through line 2-2;

FIG. 4 is a fragmentary sectional view of a detail of the seat assembly shown in FIG. 2;

FIG. 5 is a plan view of a representative component in FIG. 4; and

FIG. 6 is similar to FIG. 4 showing another embodiment.

DETAILED DESCRIPTION OF THE PREFERRED EMBODIMENT(S)

Figure 3:
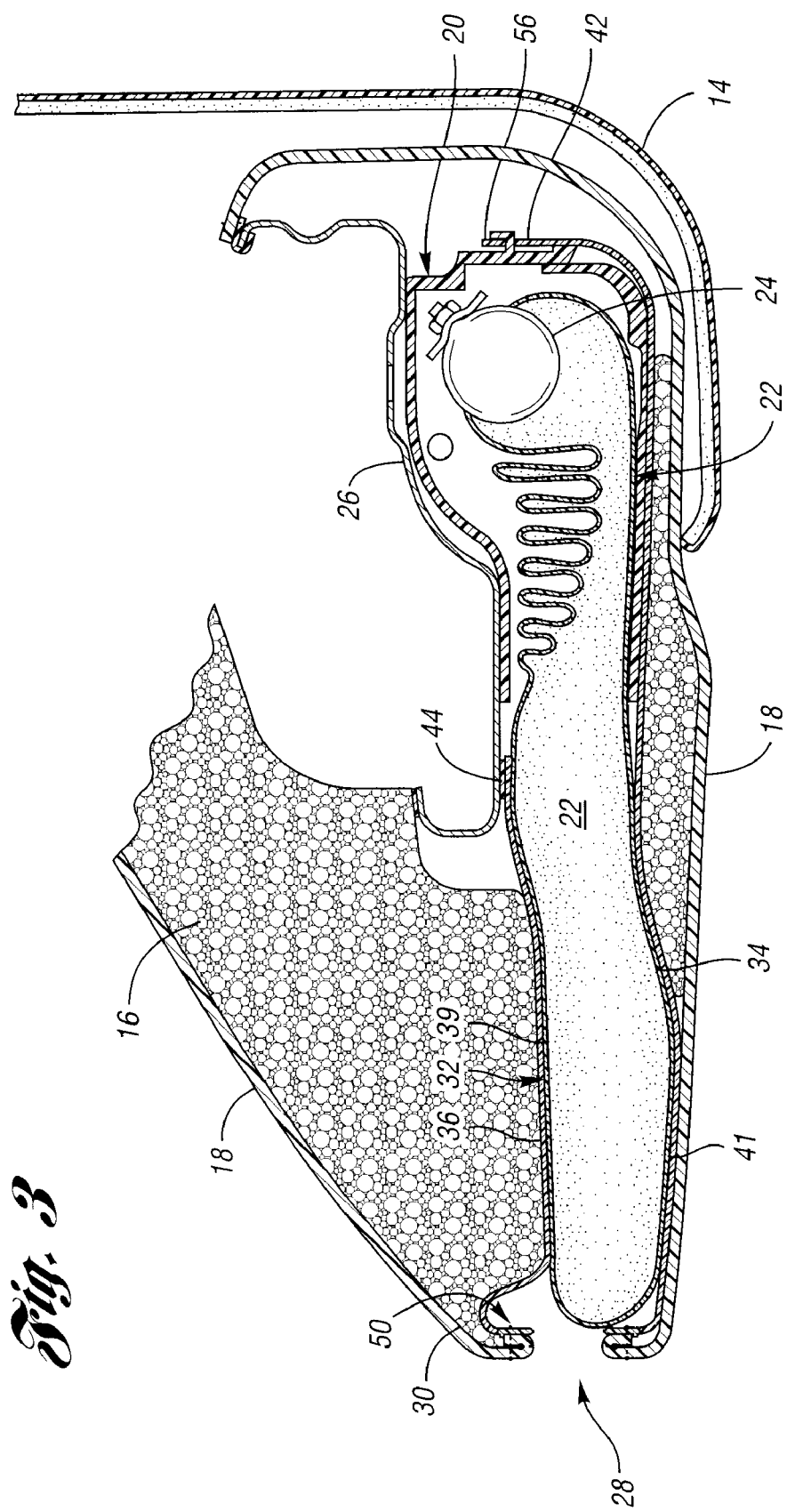
FIG. 3 is a view similar to FIG. 2 showing the parts in a different position.

As required, detailed embodiments of the present invention are disclosed herein. However, it is to be understood that the disclosed embodiments are merely exemplary of the invention that may be embodied in various alternative forms. The figures are not necessarily of scale; some features may be exaggerated or minimized to show details of particular components. Therefore specific structural and functional details disclosed herein are not to be interpreted as limiting, but merely as a representative basis for the claims and/or a representative basis for teaching one skilled in the art to variously employ the present invention.

Moreover, except where otherwise expressly indicated, all numerical quantities in this description and in the claims indicating amounts of materials or conditions of reactions and/or use are to be understood as modified by the word "about" in describing the broader scope of this invention. Practice within the numerical limits stated is generally preferred. Also, unless expressly stated to the contrary, the description of a group or class of materials as suitable preferred for a given purpose in connection with the invention implies that mixtures of any two or more members of the group or class may be equally suitable or preferred.

FIG. 1 shows a portion of a seat assembly 10 in accordance with the present invention. The seat assembly 10 includes a seat back 12, and seat pad 16 covered by a trim cover 18. As is well known, the seat assembly 16 includes a seat bottom (not shown). The trim cover 18 may be made of any suitable material such as cloth, vinyl or leather, etc. As is shown in FIG. 1, in at least some embodiments, a relatively rigid plastic molding 14 can be provided in the rear area of the seat assembly 10 to provide support and/or for aesthetics.

In at least one embodiment, the seat pad 16 is made from a molded polymeric material, such as a polyurethane foam. The use of a polymeric foam material to construct the seat pad 16 can be cost effective and can provide the flexibility needed to easily change the shape of the seat pad for different types of seat assemblies. Of course, other types of polymeric materials may be molded to form the seat pad 16.

Disposed within the seat back 12 is an air bag assembly, such as a side air bag assembly 20. While the side air bag assembly 20 is shown on the seat back 12, which is a usage for which it has particular utility, it is also possible for the side air bag assembly to be utilized with a seat bottom even though the seat back usage is specifically disclosed. Also, as illustrated, the air bag assembly 20 is located at an outboard lateral side or extremity of the seat to provide protection against adjacent vehicle structure, but it is also possible to have the side air bag assembly located at the inboard lateral side to provide protection against an adjacent vehicle occupant and to also have side air bag assemblies at both outboard and inboard locations for protection in both lateral directions.

As shown in FIG. 2, the air bag assembly 20 includes an air bag 22 and an inflator 24, which is configured to supply inflation fluid such as gas to the air bag 22, thereby facilitating deployment of the air bag 22. In at least one embodiment, the air bag assembly 20 also includes a housing 40 which at least partially surrounds the air bag 22 and the inflator 24.

Also shown in FIG. 2 is a portion of a seat frame 26 which can be used for mounting the seat assembly 10 to a vehicle. The seat pad 16 is disposed proximate the frame 26 and air bag assembly 20 and may be directly attached to the frame 26 at various points. The trim cover 18 includes an air bag release seam 28 which in at least one embodiment is adjacent to a side 30 of the seat pad 16.

The air bag assembly 20 is located within the trim cover 18 and may be conventionally mounted, such as on the frame 26, adjacent the air bag release seam 28 but in a spaced relationship from the release seam. The schematically illustrated folded air bag 22, upon deployment, is inflated by inflation fluid from the inflator 24 to unfold and project outwardly from the seat 10 through the air bag release seam 28 of the trim cover 18 (FIG. 3).

With continuing reference to FIG. 2, an air bag guide of the seat back component is generally indicated by 32 and includes an inner panel 34 and an outer panel 36 that are each made of any suitable material effective to protect the seat pad 16 during deployment of the air bag 22. As used herein, the term "inner" relates to the side closer to the driver's side door, and the term "outer" refers to the side closer to the passenger door. For example, a woven or non-woven cloth material, which may include natural or synthetic materials such as nylon, may be used to make the air bag guide. One material that is found to be effective is a polyester material, of the type from which the air bag 22 may be manufactured. Regardless of the type of material used to make the air bag guide 32, the use of the air bag guide 32 can be helpful in reducing friction on the air bag 22 as it deploys. Although a polymer such as nylon may be particularly beneficial, even a fleece material will help reduce the friction on the air bag 22. This is because the air bag guide 32 inhibits contact between the deploying air bag 22 and the seat pad 16 and helps to prevent small particles from separating from the seat pad and being introduced into the vehicle compartment.

The inner and outer panels 34, 36 of the air bag guide 32 respectively include inner extremities 42, 44 that can be attached suitably to the housing 40 and/or frame 26 to effectively associate the air bag guide 32 with the housing 40 of the air bag assembly 20. As shown in the embodiment illustrated in FIG. 2, the inner extremity 44 of the outer panel 36 is connected with the frame 26 and the inner extremity 42 of the inner panel 34 is connected with the housing 40 at 56.

As shown in FIG. 4, the inner and outer panels 34, 36 of the air bag guide 32 respectively include outer extremities 52, 54 attached to opposed ends of a connector 50 adjacent the seam 28. The outer extremities 52, 54 of inner and outer panels 34, 36 can be attached to the connector 50 by any suitable manner. For instance, the outer extremities 52, 54 can be attached to the connector 50 via stitching, ultrasonic welding, adhesive, etc., among other suitable manners. Also, in one embodiment, the connector 50 could be secured to the outer extremities 52, 54 of the air bag guide 32 via in situ molding of a polymeric seat pad 16. In this embodiment, the connector 50, already attached to the trim cover 18, and the guide 32 would both be suitably placed in the polymeric, such as polyurethane, mold so that the polymeric material used to form pad 16 could form around and secure the guide 32 to the connector 50. In at least this embodiment, the inner and outer panels 34 and 36 could have small openings, such as holes that can allow relatively small amounts of polymeric material to extend between the panels. These relatively small amounts would not hinder deployment of the air bag 22.

In at least one embodiment, the connector 50 is a unitary member having an inner side 62 and an outer side 64 separated by a frangible section 66. The outer extremity 52 of the inner panel 34 is connected to the inner side 62 of the connector 50 and the outer extremity 54 of the outer panel 36 is connected to the outer side 64 of the connector. The connector 50 can be made of any suitable relatively rigid material such as a rigid plastic such as nylon, PP (polypropylene), PE (polyethylene), and can be made by any suitable process such as injection molding and extrusion.

The frangible section 66 of the connector 50 can be any suitable section formed to break or rupture first on the connector 50. For instance, the frangible section 66 of the connector 50 could be a reduced thickness, as is shown in FIG. 4, a section having perforations or portions removed, or a section made of weaker material relative to that of sides 62, 64. In at least one embodiment, the inner and outer sides 62, 64 of the connector 50 have a general thickness t of 0.5 to 5 mm (millimeters), in other embodiments of 0.75 to 3.5 mm, and in yet other embodiments of 1.0 to 2.0 mm. In embodiments where the frangible section 66 comprises a section having a reduced thickness relative to the inner and outer sides 62, 64 of the connector 50, the frangible section 66 has a general thickness tr of 0.05 to 0.4 mm, in other embodiments of 0.075 to 0.3 mm, and in yet other embodiments of 0.1 to 0.2 mm.

As shown in FIG. 5, the connector 50 has opposed ends 70 and 72 which the frangible section 66 extends between. The connector, in at least one embodiment, as is shown in FIG. 5 includes a plurality of arms 74 depending from the frangible section 66. In at least one embodiment, the connector 50 has a length l of 250 to 500 mm, in other embodiments of 300 to 450 mm, and in yet other embodiments of 350 to 400 mm. In at least one embodiment, the connector 50 has a width w of 25 to 150 mm, in other embodiments of 40 to 125 mm, and in yet other embodiments of 50 to 100 mm.

In at least one embodiment, the air bag guide 32 is effective to prohibit all contact between the deploying air bag 22 and the seat pad 16. This can help to prevent energy loss from the air bag 22 by decreasing friction and protecting the seat pad 16 from damage. This, in turn, can also help to reduce the deployment time for the air bag 22 and/or the amount of inflation fluid required to deploy the air bag.

In at least one embodiment, the inner and outer panels 34 and 36 of the air bag guide 32 form a deployment channel 38 for the air bag 22. As shown in FIGS. 2-4, the deployment channel 38 is oriented to facilitate deployment of the air bag 22 through the seam 28 in the trim cover 18.

Upon deployment of the air bag assembly 20, as shown schematically in FIG. 3, the deploying air bag 22 causes relative movement of the flexible inner and outer panels 34 and 36 away from each other which then provide a guiding function of the unfolding air bag 22 as it moves between the panels toward the air bag release seam 28 and eventually tears open the release seam for outward projection of the air bag to provide the occupant protection. Furthermore, as the air bag 22 deploys through the deployment channel 38, the air bag guide 32 acts as a blocking member that forms a barrier on two sides 39, 41 of the air bag 22, thereby inhibiting contact between the air bag 22 and the seat pad 16. Thus, the seat pad 16 is moved away from the air bag 22 as it deploys through the deployment channel 38.

As shown in FIGS. 3-4, the attachment of the outer extremities 52, 54 to opposed ends of the connector 50 adjacent the seam 28 helps to facilitate deployment of the air bag 22 through the seam 28. This is because the deployment channel 38 opens as the air bag 22 is deployed, and this causes the connector 50 to rupture at frangible section 66 adjacent the seam 28 directing the deploying air bag 22 to exert an outward force on the trim cover 18 at the seam 28; this helps to open the seam 28 to provide an easy exit for the air bag 22. Also connector 50 helps to ensure that the air bag 22 will deploy in the predetermined desired manner through the seam 18. Because of connectors 50 relatively consistent manufacturing process, use of connector 50 can help ensure relatively consistent deployment of air bag in seat assemblies 10 employing the use of connector 50.

As shown in FIG. 4, the seam 28 can be sewn, or otherwise attached, at locations 56, 58, where the sides 62, 64 of the connector 50 are connected with end portions of the trim cover 18. This helps to transfer the force from the air bag guide 32, and facilitates separation of the seam 28. As shown in the embodiment illustrated in FIG. 4, the seam 28 can also be optionally sewn, or the ends of the cover be otherwise attached, at location 60. In an embodiment shown in FIG. 4, the connector 50 includes opposed stops 78 that depend upward from the connector. In this embodiment, the stops 78 act as a locator on the connector 50 for the ends of the trim cover 18.

FIG. 6 illustrates another embodiment of the connector 50'. The connector 50' is similar in construction and operation to the connector 50 shown in FIG. 4. The connector 50' illustrated in FIG. 6 includes a first connector portion 51 and a second connector portion 53 engageable with the first connector portion 51.

The first connector portion 51 is illustrated in FIG. 6 to have a main body portion 57, a leg portion 63 extending from one end of the body portion 57, and a tab portion 65 extending from an opposite end of the body portion 57. The leg portion 63 is connected to one end of the trim cover 18. In the embodiment shown in FIG. 6, the leg portion 63 is connected at 56 to an inside end 31 of the trim cover 18 and the tab portion 65 is connected at 56 to the outer extremity 52 of the inner panel 34. The body portion 57 includes surfaces, such as the sloped inclined surfaces 61 shown in FIG. 6, that cooperate to help form a recess 35 that the second connector portion 53 is received within.

As shown in the embodiment illustrated in FIG. 6, the second connector portion 53 is attached at 58' to an outer end 33 of trim cover 18 and outer end 33 of trim cover 18 is also attached at 58' to the outer extremity 54 of the outer panel 36. In the embodiment shown in FIG. 6, the outer extremity 54 of the outer panel 36 is disposed between bent portions of the outer end 33 of trim cover 18. In the embodiment illustrated in FIG. 6, the second connector 53 includes surfaces, such as sloped declined surfaces 71, that are engageable with the surfaces 61 of body portion 57 of the first connector portion 51.

The tab portion 65 of the first connector portion 51 will deflect upon deployment of the air bag assembly 20 as the inner and outer panels 34 and 36 move relative to each other. Deflection of the tab portion 65 will cause the first connector 51 to disengage from the second connector 53 with relatively little force. This directs the air bag 22 towards the release seam 28 to eventually tear open the release seam so the air bag can project outward of the release seam 28 to provide occupant protection.

It should be understood that the orientation of the connector 50' could be the reverse of that which is shown in FIG. 6. For instance, leg portion 63 could be connected to outer end 33 of trim cover 18 with tab portion 65 being connected to outer panel 36 and second connector portion 53 being connected to inner end 31 of trim cover. Also, the width of tab portion 65 can be any suitable width. In at least one embodiment, the width of tab portion 65 is less than the width of body portion 57. Furthermore, stitchings or connections 56 and 58' could extend to the outside of trim cover, and/or additional stitchings or connections could be included to provide additional support or reinforcement.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly, comprising:
   a frame;
   a seat pad adjacent the frame;
   a trim cover extending over the seat pad and including an
   air bag release seam adjacent the seat pad, the trim cover having an interior surface facing the seat pad and an opposed exterior surface;

an air bag assembly mounted on the frame within the trim cover in a spaced relationship from the air bag release seam, the air bag assembly including an inflator and a folded air bag that is inflated by the inflator to unfold and project outwardly from the seat through the air bag release seam of the trim cover; and an air bag guide including an inner panel and an outer panel that are each made of flexible material and have outer extremities; and a rigid plastic connector connected to the interior surface of the trim cover adjacent the interior surface of the trim cover, the connector connecting the outer extremities of the flexible inner and outer panels to each other adjacent the air bag release seam, wherein the connector is a unitary member that extends between and connects outer extremities of the flexible inner and outer panels to each other adjacent the air bag release seam, and wherein the unitary member has opposed ends, each of the ends connecting to a respective one of the outer extremities of the flexible inner and outer panels, the air bag guide being made of a cloth material.

2. The vehicle seat assembly of claim 1, wherein the connector is connected to the trim cover adjacent the air bag release seam, the release seam being formed by ends of the trim cover that contact each other.

3. The vehicle seat assembly of claim 2, wherein stitching connects the connector to the trim cover adjacent the air bag release seam.

4. The vehicle seat assembly of claim 1, wherein the unitary member includes a frangible portion adjacent the air bag release seam.

5. The vehicle seat assembly of claim 1, wherein stitching connects the ends to the respective one of the outer extremities of the flexible inner and outer panels.

6. The vehicle seat assembly of claim 1, wherein the connector has a length of 250 to 500 mm, a width of 25 to 150 mm, and a substantial portion having a thickness of 0.5 to 5 mm.

7. The vehicle seat assembly of claim 1, wherein the unitary member, includes a frangible portion adjacent the air bag release seam, and includes opposed projecting stops disposed at opposed ends of the member.

8. The vehicle seat assembly of claim 1, wherein at least one of the flexible inner and outer panels have inner extremities connected to the frame.

9. A vehicle seat assembly, comprising:

a frame;

a seat pad mounted on the frame;

a trim cover extending over the seat pad and including an air bag release seam adjacent the seat pad;

an air bag assembly within the trim cover spaced from the air bag release seam, the air bag assembly including an inflator and an air bag that is inflated by the inflator to project outwardly from the seat through the air bag release seam of the trim cover;

an air bag guide including a first panel and a second panel, each panel being made of flexible material and having outer extremities; and a rigid plastic connector for connecting the outer extremities of the panels to each other adjacent the air bag release seam, wherein the connector is connected to the trim cover adjacent the air bag release seam, wherein the connector comprises a first connector portion connecting a first portion of the trim cover with a first one of the panels and a second connector portion connected to a second portion of the trim cover and the second one of the panels, with the first connector portion having a main body portion having a recess for receiving the second connector portion, the first connector portion further including a leg extending from the main body portion connected to the first portion of the trim cover and a tab portion extending from the main body portion connected to the first panel.

\* \* \* \* \*